US008855485B2

(12) United States Patent
Nakagawa et al.

(10) Patent No.: US 8,855,485 B2
(45) Date of Patent: Oct. 7, 2014

(54) FREQUENCY OFFSET ESTIMATING METHOD AND FREQUENCY OFFSET ESTIMATING APPARATUS

(75) Inventors: Tadao Nakagawa, Yokosuka (JP); Yasushi Takatori, Yokosuka (JP); Riichi Kudo, Yokosuka (JP); Munehiro Matsui, Yokosuka (JP); Koichi Ishihara, Yokosuka (JP); Takayuki Kobayashi, Yokosuka (JP); Etsushi Yamazaki, Yokosuka (JP); Akihide Sano, Yokosuka (JP); Eiji Yoshida, Yokosuka (JP); Masato Mizoguchi, Yokosuka (JP); Yutaka Miyamoto, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 189 days.

(21) Appl. No.: 13/640,114

(22) PCT Filed: Apr. 14, 2011

(86) PCT No.: PCT/JP2011/059249
§ 371 (c)(1),
(2), (4) Date: Oct. 9, 2012

(87) PCT Pub. No.: WO2011/129389
PCT Pub. Date: Oct. 20, 2011

(65) Prior Publication Data
US 2013/0028595 A1 Jan. 31, 2013

(30) Foreign Application Priority Data

Apr. 16, 2010 (JP) ................................. 2010-094968

(51) Int. Cl.
H04B 10/08 (2006.01)
H04J 11/00 (2006.01)
H01Q 17/00 (2006.01)
H04L 27/26 (2006.01)

(52) U.S. Cl.
CPC ........ *H04L 27/2657* (2013.01); *H04L 27/2684* (2013.01); *H04L 27/2676* (2013.01)
USPC ...... 398/25; 398/9; 398/1; 375/259; 375/330; 370/329; 370/280

(58) Field of Classification Search
CPC ...... H04B 1/56; H04B 7/2656; H04B 10/077; H04B 10/07955; H04J 3/0682

USPC ......... 398/9, 25; 370/280, 329; 375/259, 330, 375/276
See application file for complete search history.

(56) References Cited

U.S. PATENT DOCUMENTS 5,663,733 A * 9/1997 Lennen ..................... 342/357.69
5,909,664 A * 6/1999 Davis et al. ................ 704/200.1
(Continued)

FOREIGN PATENT DOCUMENTS

CN 1139502 A 1/1997
CN 1568594 A 1/2005
(Continued)

OTHER PUBLICATIONS

Office Action, Chinese Patent Application No. 201180018543.0, Jan. 6, 2014.
(Continued)

*Primary Examiner* — Oommen Jacob
(74) *Attorney, Agent, or Firm* — Harness, Dickey & Pierce, P.L.C.

(57) ABSTRACT

When a circuit that calculates a frequency offset using a shape of a frequency spectrum is implemented by hardware, the circuit size can be reduced. A frequency offset estimating method for estimating the difference between a carrier frequency of a reception signal and the frequency of an output signal of a local oscillator includes performing a discrete Fourier transform on a reception signal previously sampled at a predetermined sampling frequency and outputting a frequency spectrum with a plurality of frequency components, calculating an average power of the frequency spectrum, calculating a threshold by adding a predetermined value to the average power or power obtained by multiplying the average power by a constant, performing 1-bit quantization on powers of the frequency components of the frequency spectrum based on the threshold, and calculating a centroid frequency by multiplying frequencies of the frequency components by powers of 1-bit quantized frequency components, calculating the sum of multiplied products, and dividing the sum of the products by the sum of the powers of the 1-bit quantized frequency components of the frequency spectrum.

10 Claims, 9 Drawing Sheets

(56) References Cited

U.S. PATENT DOCUMENTS

| | | | |
|---|---|---|---|
| 6,021,386 A * | 2/2000 | Davis et al. | 704/229 |
| 2005/0128120 A1* | 6/2005 | Cirillo et al. | 342/1 |
| 2008/0240296 A1* | 10/2008 | Hunt | 375/326 |
| 2009/0287083 A1* | 11/2009 | Kushculey et al. | 600/449 |
| 2010/0097923 A1* | 4/2010 | Zhao et al. | 370/210 |
| 2012/0076216 A1* | 3/2012 | Zhang | 375/259 |
| 2013/0028595 A1* | 1/2013 | Nakagawa et al. | 398/25 |

FOREIGN PATENT DOCUMENTS

| | | | |
|---|---|---|---|
| JP | 11-098103 A | | 4/1999 |
| JP | 3649560 B | | 5/2005 |
| JP | 2007-520931 A | | 7/2007 |
| JP | 4108699 B2 | | 6/2008 |

OTHER PUBLICATIONS

Leven, Andreas et al., "Frequency Estimation in Intradyne Reception", IEEE Photonics Technology Letters, vol. 19, pp. 366-368, Mar. 2007.

International Search Report (in Japanese with English translation) and Written Opinion (in Japanese) for PCT/JP2011/059249, mailed May 17, 2011; ISA/JP.

* cited by examiner

FREQUENCY OFFSET ESTIMATING METHOD AND FREQUENCY OFFSET ESTIMATING APPARATUS

TECHNICAL FIELD

The present invention relates to a digital coherent optical receiver and a wireless communications receiver, and more particularly, to a frequency offset estimating method and a frequency offset estimating apparatus.

This application is a 371 U.S. National Stage of International Application No. PCT/JP2011/059249, filed on Apr. 14, 2011, which claims priority to Japanese Patent Application No. 2010-094968 filed on Apr. 16, 2010. The contents of the above applications are incorporated herein by reference in their entirety.

BACKGROUND ART

In an optical communications field, digital coherent communications systems in which a coherent detection scheme of dramatically improving frequency utilization efficiency is combined with digital signal processing are attracting attention. Compared to systems constructed based on direct detection, digital coherent communications systems are known to be capable of not only improving receiving sensitivity but also compensating for waveform distortion of a transmission signal caused by chromatic dispersion and/or polarization mode dispersion resulting from optical fiber transmission since a receiver receives a signal from a transmitter as a digital signal. For this reason, introduction of the digital coherent communications system as a next generation optical communications technique is being discussed.

Signal light received by a coherent receiver is multiplied by local oscillator light and converted into a baseband signal. In a laser oscillator that generates a carrier of signal light or local oscillator light, it is difficult to implement frequency stabilization by a phase-locked loop which is generally used in an oscillator for wireless communications, and a large frequency offset between an output frequency of a laser oscillator of a transmitter and an output frequency of a laser oscillator of a receiver occurs. In an actual optical communications system, a frequency offset reaches ±5 GHz. In a coherent communications system, since information is carried on the phase of a carrier, it is necessary for a receiver to estimate and compensate for a frequency offset.

Furthermore, in wireless communications, a frequency offset occurs due to errors of oscillation frequencies of reference oscillators used in a transmitter and a receiver and the Doppler shift associated with movement of a transmitter and a receiver. Even in this case, it is necessary for the receiver to estimate and compensate for a frequency offset.

A method using a phase increment algorithm utilizing phase shift information of a symbol during one symbol period, which is disclosed in Non-Patent Document 1, is known as a frequency offset estimating technique. However, in this method, an estimable frequency offset range is limited.

In contrast, Patent Document 1 discusses a method for estimating a frequency offset using the shape of a frequency spectrum of an orthogonal frequency division multiplexing (OFDM) signal. In this case, an estimable frequency offset range can be increased as compared to that in the phase increment algorithm.

FIG. 10 is a block diagram illustrating a configuration example of a conventional frequency offset estimating apparatus. Referring to FIG. 10, a frequency offset estimating apparatus 104 includes a serial-to-parallel converting circuit 5, a discrete Fourier transform (DFT) circuit 6, and a centroid calculating circuit 7. Furthermore, a first A/D converter 1, a second A/D converter 2, and a combining circuit 3 are connected to the frequency offset estimating apparatus 104 as peripheral circuits of the frequency offset estimating apparatus 104.

The first A/D converter 1 performs analog-to-digital conversion on an in-phase component (I signal) of a reception signal, the second A/D converter 2 performs analog-to-digital conversion on a quadrature-phase component (Q signal) of the reception signal, and then the combining circuit 3 converts the analog-to-digital converted signals into a signal of a complex number of I+jQ. An output signal of the combining circuit 3 is input to the frequency offset estimating apparatus 104.

FIGS. 11 and 12 are conceptual diagrams illustrating an operation of the conventional frequency offset estimating apparatus 104. FIGS. 11 and 12 each illustrate a frequency spectrum of the reception signal, which is an output signal of the discrete Fourier transform circuit 6. FIG. 11 illustrates a frequency spectrum when there is no frequency offset, and FIG. 12 illustrates a frequency spectrum when there is a frequency offset. Here, it is assumed that $(1, 2, \ldots, N_S)$ are frequency numbers of a discrete Fourier transform, $P_i$ is signal power of the frequency component of a frequency number i, and C is the frequency number corresponding to a reference frequency, and, for example, C is selected as $N_S/2$. At this time, a signal $\delta W/W_t$ proportional to the frequency offset is obtained through the following Formula (1).

[Formula 1]

$$\frac{\delta W}{W_t} = \frac{-\sum_{i=1}^{C} P_i + \sum_{i=C}^{N_S} P_i}{\sum_{i=1}^{N_S} P_i} \quad (1)$$

PRIOR ART DOCUMENTS

Patent Document

Patent Document 1: Japanese Patent No. 3649560

Non-Patent Document

Non-Patent Document 1: Andreas Leven et al., "Frequency Estimation in Intradyne Reception", IEEE Photonics Technology Letters, volume 19, pp. 366-368, March 2007.

SUMMARY OF INVENTION

Problems to be solved by the Invention

However, when the conventional frequency offset estimating method of calculating the frequency offset using Formula (1) is implemented in a digital signal processor (DSP), which is hardware, there is a problem in that the circuit size for division calculation increases.

Generally, when the frequency offset estimating method is implemented in the DSP, if a floating-point calculation is used in a divider, the circuit size significantly increases compared to that for a fixed-point calculation, and a calculation speed decreases; thus, a fixed-point calculation needs to be performed. In the fixed-point calculation, when a divisor is a power of 2, it can be processed by a simple calculation using only a bit shift, but when a divisor is not a power of 2, a complex calculation is necessary.

Particularly, if a dynamic range of a divisor is large, it is difficult to find the position of a decimal point for which neither an overflow nor an underflow occurs and high calculation accuracy is simultaneously obtained, and if the position of a decimal point is determined so as to provide a wide margin, the circuit size increases.

A denominator in Formula (1) is the sum of powers of frequency components of an input signal, and has various real number values corresponding to a dynamic range of an input signal power determined depending on a communications system; thus, there is a problem in that the circuit size increases.

The present invention is made in light of such circumstances, and an object thereof is to provide a frequency offset estimating method and a frequency offset estimating apparatus which are capable of reducing the size of a circuit implemented by hardware by making it possible to set a divisor of a division calculation to a power of 2 or an integer value within a limited range when a frequency offset is calculated using the shape of a frequency spectrum.

Means for Solving the Problems

In order to solve the above-mentioned problems, the present invention is a frequency offset estimating method for estimating the difference between a carrier frequency of a reception signal and the frequency of an output signal of a local oscillator, the method including: a step of performing a discrete Fourier transform on a reception signal previously sampled at a predetermined sampling frequency and outputting a frequency spectrum with a plurality of frequency components; a step of calculating an average power of the frequency spectrum; a step of calculating a threshold by adding a predetermined value to the average power or power obtained by multiplying the average power by a constant; a step of performing 1-bit quantization on powers of the frequency components of the frequency spectrum based on the threshold; and a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

The present invention is a frequency offset estimating method for estimating the difference between a carrier frequency of a reception signal and the frequency of an output signal of a local oscillator, the method including: a step of performing a discrete Fourier transform on a reception signal previously sampled at a predetermined sampling frequency and outputting a frequency spectrum with a plurality of frequency components; a step of sorting the plurality of frequency components of the frequency spectrum in order of power levels; a step of calculating a threshold by adding a predetermined value to a power value of a specific order among the sorted frequency components or power obtained by multiplying the power value of the specific order by a constant; a step of performing 1-bit quantization on powers of the frequency components of the frequency spectrum based on the threshold; and a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

The present invention is a frequency offset estimating method for estimating the difference between a carrier frequency of a reception signal and the frequency of an output signal of a local oscillator, the method including: a step of performing a discrete Fourier transform on a reception signal previously sampled at a predetermined sampling frequency and outputting a frequency spectrum with a plurality of frequency components; a step of sorting the plurality of frequency components of the frequency spectrum in order of power levels; a step of calculating a threshold by arithmetically averaging power of the plurality of sorted frequency components; a step of performing 1-bit quantization on powers of the frequency components of the frequency spectrum based on the threshold; and a step of calculating a centroid frequency by multiplying the frequencies of the frequency components by powers of the 1-bit quantized frequency components, calculating the sum of multiplied products, and dividing the sum of the products by the sum of the powers of the 1-bit quantized frequency components of the frequency spectrum.

In the present invention, in the step of calculating the threshold, when $N_S=2^m$, $k=0, 1, 2, \ldots, m-1$, and $N_S$ frequency components are sorted in descending order of power levels, the average value of a $(2^k)^{th}$ power value and a $(2^k+1)^{th}$ power value from the beginning may be set as the threshold.

The present invention is a frequency offset estimating method for estimating the difference between a carrier frequency of a reception signal and the frequency of an output signal of a local oscillator, the method including: a step of performing a discrete Fourier transform on a reception signal previously sampled at a predetermined sampling frequency and outputting a frequency spectrum with a plurality of frequency components; a step of performing 1-bit quantization on powers of the frequency components of the frequency spectrum based on a previously set threshold; and a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

Further, in order to solve the above-mentioned problems, the present invention is a frequency offset estimating apparatus for estimating the difference between a carrier frequency of a reception signal and the frequency of an output signal of a local oscillator, the apparatus including: a discrete Fourier transform unit that performs a discrete Fourier transform on a reception signal previously sampled at a predetermined sampling frequency and outputs a frequency spectrum with a plurality of frequency components; an average power calculating unit that calculates an average power of the frequency spectrum transformed by the discrete Fourier transform unit; a threshold power calculating unit that calculates a threshold by adding a predetermined value to the average power calculated by the average power calculating unit or power obtained by multiplying the average power by a constant; a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of the frequency components of the frequency spectrum transformed by the discrete Fourier transform unit by powers of the frequency components 1-bit quantized by the 1-bit quantizing unit, calculates the sum of multiplied products, and divides the sum of the products by the sum of the powers of the 1-bit quantized frequency components of the frequency spectrum.

The present invention is a frequency offset estimating apparatus for estimating the difference between a carrier frequency of a reception signal and the frequency of an output signal of a local oscillator, the apparatus including: a discrete Fourier transform unit that performs a discrete Fourier transform on a reception signal previously sampled at a predetermined sampling frequency and outputs a frequency spectrum with a plurality of frequency components; a power value sorting unit that sorts the plurality of frequency components of the frequency spectrum transformed by the discrete Fourier transform unit in order of power levels; a threshold power calculating unit that calculates a threshold by adding a predetermined value to a power value of a specific order among the frequency components sorted by the power value sorting unit or power obtained by multiplying the power value of the specific order by a constant; a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of the frequency components of the frequency spectrum transformed by the discrete Fourier transform unit by powers of frequency components 1-bit quantized by the 1-bit quantizing unit, calculates the sum of multiplied products, and divides the sum of the products by the sum of the powers of the 1-bit quantized frequency components of the frequency spectrum.

The present invention is a frequency offset estimating apparatus for estimating the difference between a carrier frequency of a reception signal and the frequency of an output signal of a local oscillator, the apparatus including: a discrete Fourier transform unit that performs a discrete Fourier transform on a reception signal previously sampled at a predetermined sampling frequency and outputs a frequency spectrum with a plurality of frequency components; a power value sorting unit that sorts the plurality of frequency components of the frequency spectrum transformed by the discrete Fourier transform unit in order of power levels; a threshold power calculating unit that calculates a threshold by arithmetically averaging power of the plurality of frequency components sorted by the power value sorting unit; a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of frequency components of the frequency spectrum transformed by the discrete Fourier transform unit by powers of the frequency components 1-bit quantized by the 1-bit quantizing unit, calculates the sum of multiplied products, and divides the sum of the products by the sum of the powers of the 1-bit quantized frequency components of the frequency spectrum.

In the present invention, when $N_S=2^m$, $k=0, 1, 2, \ldots, m-1$, and $N_S$ frequency components are sorted in descending order of power levels, the threshold power calculating unit may set the average value of a $(2^k)^{th}$ power value and a $(2^k+1)^{th}$ power value from the beginning as the threshold.

The present invention is a frequency offset estimating apparatus for estimating the difference between a carrier frequency of a reception signal and the frequency of an output signal of a local oscillator, the apparatus including: a discrete Fourier transform unit that performs a discrete Fourier transform on a reception signal previously sampled at a predetermined sampling frequency and outputs a frequency spectrum with a plurality of frequency components; a 1-bit quantizing unit that performs 1-bit quantization on powers of the frequency components of the frequency spectrum based on a previously set threshold; and a centroid calculating unit that calculates a centroid frequency by multiplying the frequencies of the frequency components of the frequency spectrum transformed by the discrete Fourier transform unit by powers of frequency components 1-bit quantized by the 1-bit quantizing unit, calculates the sum of multiplied products, and divides the sum of the products by the sum of the powers of the 1-bit quantized frequency components of the frequency spectrum.

Effects of the Invention

According to the present invention, when a circuit that calculates a frequency offset using the shape of a frequency spectrum is implemented by hardware, the circuit size can be reduced.

MODES FOR CARRYING OUT THE INVENTION

Hereinafter, embodiments of the present invention will be described with reference to the drawings. It is to be noted that in the following drawings, the same (or corresponding) components are denoted by the same reference symbols.

Embodiments of the present invention are characterized in that when a frequency offset is calculated using the shape of a frequency spectrum, 1-bit quantization is performed on signal power of each frequency component by determining threshold power in advance and by comparing the threshold power with the signal power of each frequency component, and a centroid frequency is calculated based on the quantized signal power. As a result, since the centroid frequency becomes identical to the frequency offset, an advantageous effect is obtained in that the frequency offset can be estimated. Moreover, because a denominator used to calculate (divide) the centroid is an integer value ranging from 1 to $N_S$, an advantageous effect is obtained in that the circuit size can be reduced. Furthermore, when the threshold power is calculated using a median, a denominator for division can be set to a power of 2, and thus the circuit size can be significantly reduced. Hereinafter, these features will be described in further detail.

A. First Embodiment

Figure 1:
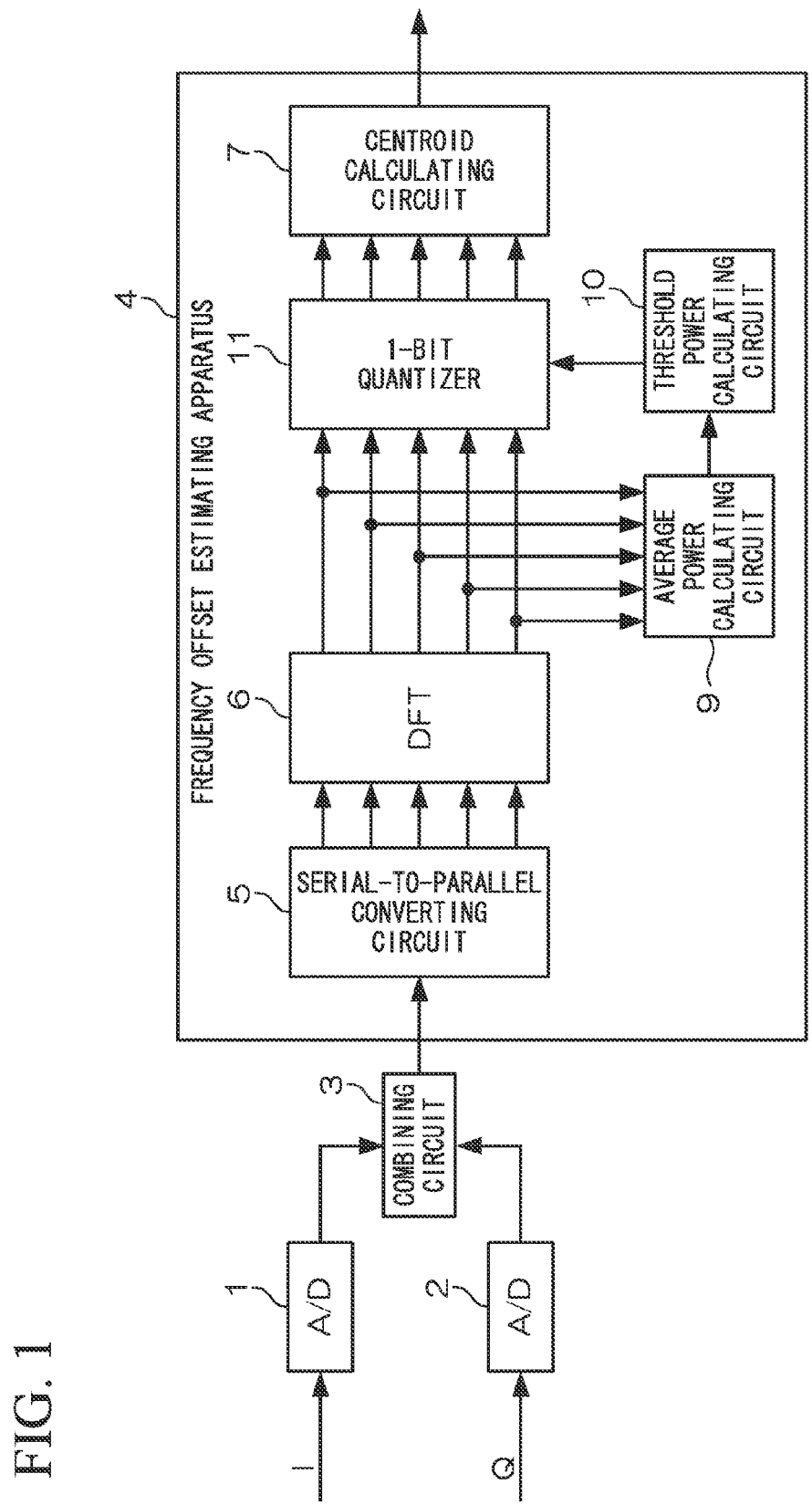
FIG. 1 is a block diagram illustrating a configuration example of a frequency offset estimating apparatus according to a first embodiment of the present invention.

FIG. 1 is a block diagram illustrating a configuration example of a frequency offset estimating apparatus according to a first embodiment of the present invention. Referring to FIG. 1, a frequency offset estimating apparatus 4 includes a serial-to-parallel converting circuit 5, a discrete Fourier transform (DFT) circuit 6, an average power calculating circuit 9, a threshold power calculating circuit 10, a 1-bit quantizer 11, and a centroid calculating circuit 7. Furthermore, a first A/D converter 1, a second A/D converter 2, and a combining circuit 3 are connected to the frequency offset estimating apparatus 4 as peripheral circuits of the frequency offset estimating apparatus 4.

The serial-to-parallel converting circuit 5 including one input port and $N_S$ output ports performs serial-to-parallel conversion on a signal input to the frequency offset estimating apparatus 4, and the discrete Fourier transform circuit 6 performs a discrete Fourier transform on a reception signal which is sampled in advance at a predetermined sampling frequency and outputs a frequency spectrum with $N_S$ frequency components. The size $N_S$ of the discrete Fourier transform is generally an integer power of 2. A fast Fourier transform (FFT) or the like may be used as an algorithm for executing the discrete Fourier transform (DFT).

Each output signal of the discrete Fourier transform circuit 6 is split into two, one of them is input to the 1-bit quantizer 11, and the other is input to the average power calculating circuit 9. The average power calculating circuit 9 calculates average power of a frequency spectrum output from the discrete Fourier transform circuit 6. The threshold power calculating circuit 10 calculates threshold power based on the average power. The 1-bit quantizer 11 performs 1-bit quantization on the output signal of the discrete Fourier transform circuit 6 using the threshold power. The 1-bit quantizer 11 operates as a comparator. The centroid calculating circuit 7 calculates a centroid frequency (which is identical to a frequency offset in the first embodiment) based on the frequency of each frequency component and power of each 1-bit quantized frequency component.

Figure 2:
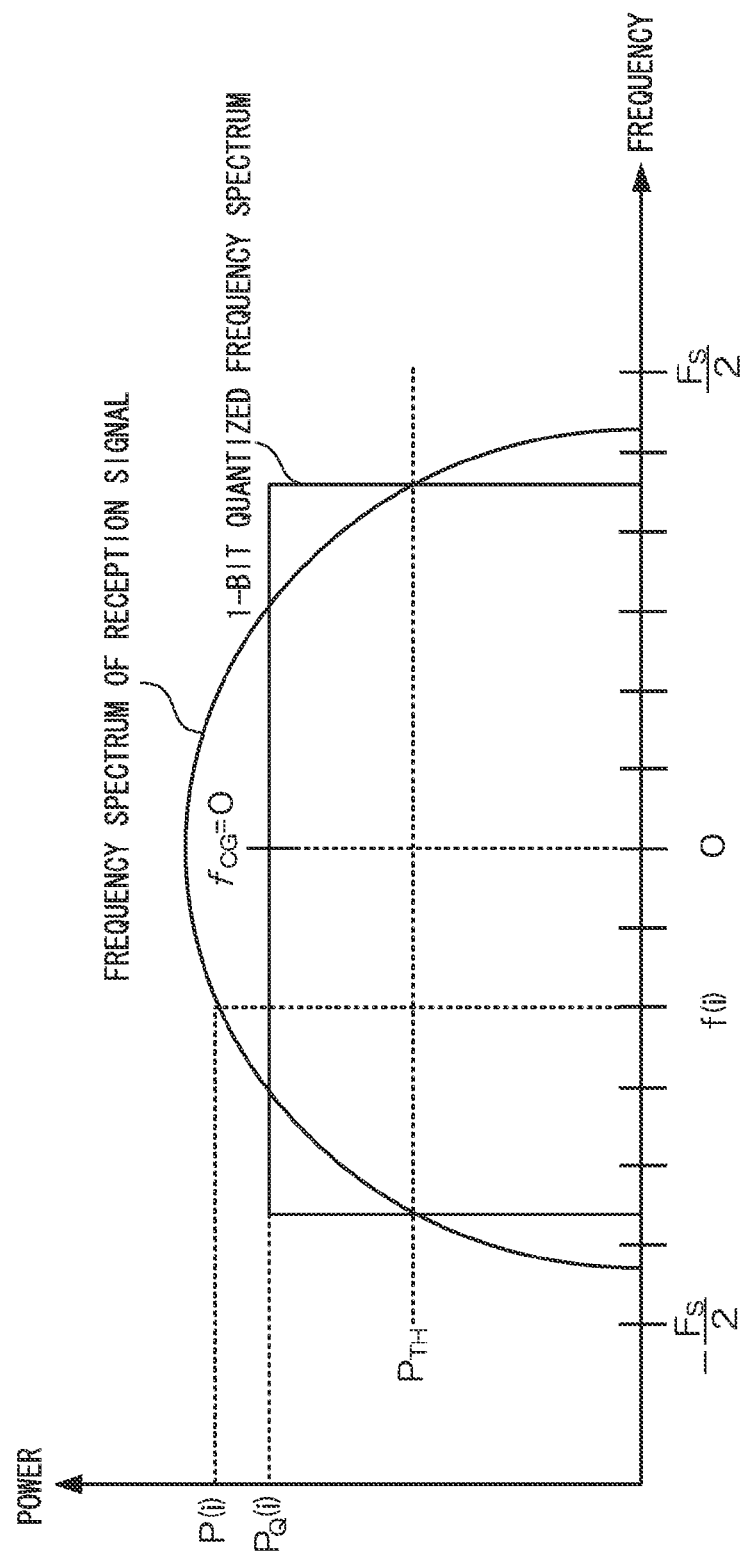
FIG. 2 illustrates an operation of the first embodiment and is a conceptual diagram illustrating a frequency spectrum when there is no frequency offset.
Figure 3:
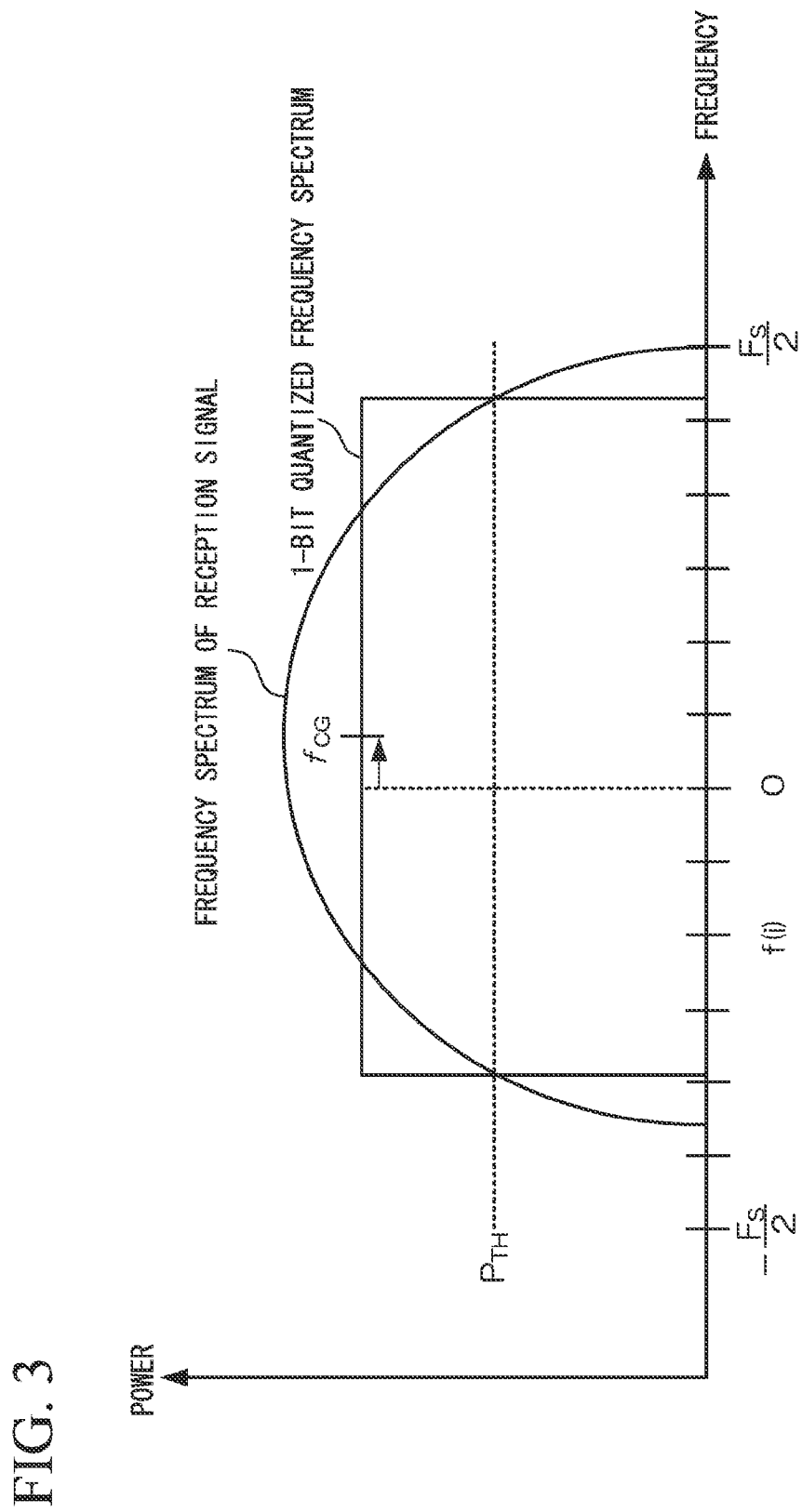
FIG. 3 illustrates an operation of the first embodiment and is a conceptual diagram illustrating a frequency spectrum when there is a frequency offset.

FIG. 2 illustrates an operation of the first embodiment and is a conceptual diagram illustrating a frequency spectrum when there is no frequency offset. FIG. 3 illustrates an operation of the first embodiment and is a conceptual diagram illustrating a frequency spectrum when there is a frequency offset. FIGS. 2 and 3 each illustrate a frequency spectrum of a reception signal and a 1-bit quantized frequency spectrum, which are the output signal of the discrete Fourier transform circuit 6 and the output signal of the 1-bit quantizer 11, respectively.

Assuming that, in the frequency spectrum which is the output signal of the discrete Fourier transform circuit 6, the signal power of the frequency component of a frequency f(i) is P(i), the average power calculated by the average power calculating circuit 9 is $P_{AVE}$, and the threshold power calculated by the threshold power calculating circuit 10 is $P_{TH}$, and in the output signal of the 1-bit quantizer 11, the signal power of the frequency component of the frequency f(i) is $P_Q(i)$, $P_{AVE}$, $P_{TH}$, and $P_Q(i)$ satisfy the following Formulas (2), (3), and (4).

[Formula 2]

$$P_{AVE} = \frac{\sum_{i=1}^{N_s} P(i)}{N_s} \quad (2)$$

[Formula 3]

$$P_{TH} = aP_{AVE} + b \text{ ($a$ and $b$ are constants)} \quad (3)$$

[Formula 4]

$$P_Q(i) = \begin{cases} 1 & (P(i) \geq P_{TH}) \\ 0 & (P(i) < P_{TH}) \end{cases} \quad (4)$$

In this case, the centroid frequency $f_{CG}$ is given as the following Formula (5).

[Formula 5]

$$f_{CG} = \frac{\sum_{i=1}^{N_s} f(i)P_Q(i)}{\sum_{i=1}^{N_s} P_Q(i)} \quad (5)$$

Here,

[Formula 6]

$$f(i) = \frac{F_s}{N_s}\left(i - \frac{N_s}{2}\right) \quad (6)$$

$F_S$ represents the sampling frequency. i is a variable that takes an integer value ranging from 1 to $N_S$, and, according to Formula (6), the frequency f(i) takes a value ranging from $(-\frac{1}{2}+1/N_S)F_S$ to $\frac{1}{2}F_S$. Here, when the frequency spectrum is symmetric to the center frequency, Formula (5) becomes almost zero.

Here, the signal power of the frequency component of the frequency f(i) is P(i), and in the frequency spectrum when a frequency offset Δf is added, the signal power of the frequency component of (f(i)+Δf) becomes P(i). Moreover, this relation is maintained even after 1-bit quantization. Thus, when the frequency offset Δf exists, the centroid frequency $f_{CG}$ is given as the following Formula (7).

[Formula 7]

$$f_{CG} = \frac{(f(1)+\Delta F)P_Q(1)+(f(2)+\Delta f)P_Q(2)+\ldots+(f(N)+\Delta f)P_Q(N)}{\sum_{i=1}^{N_s} P_Q(i)} \quad (7)$$

$$= \frac{\sum_{i=1}^{N_s} f(i)P_Q(i)}{\sum_{i=1}^{N_s} P_Q(i)} + \frac{\Delta f \sum_{i=1}^{N_s} P_Q(i)}{\sum_{i=1}^{N_s} P_Q(i)}$$

$$= \Delta f$$

In other words, the centroid frequency $f_{CG}$ is identical to the frequency offset Δf. In the first embodiment, since the denominator $N_S$ of Formula (2) used to calculate the average power is a power of 2, the circuit size can be reduced. Furthermore, since Formula (3) used to calculate the threshold power is a calculation of adding a predetermined value to the average power or power obtained by multiplying the average power by a constant and a division calculation is not necessary, the circuit size can be reduced.

Furthermore, since the denominator of Formula (5) used to calculate the centroid frequency $f_{CG}$ is confined to an integer value ranging from 1 to $N_S$ regardless of the shape of the frequency spectrum and the level of the input signal power, the circuit size can be reduced.

Figure 4:
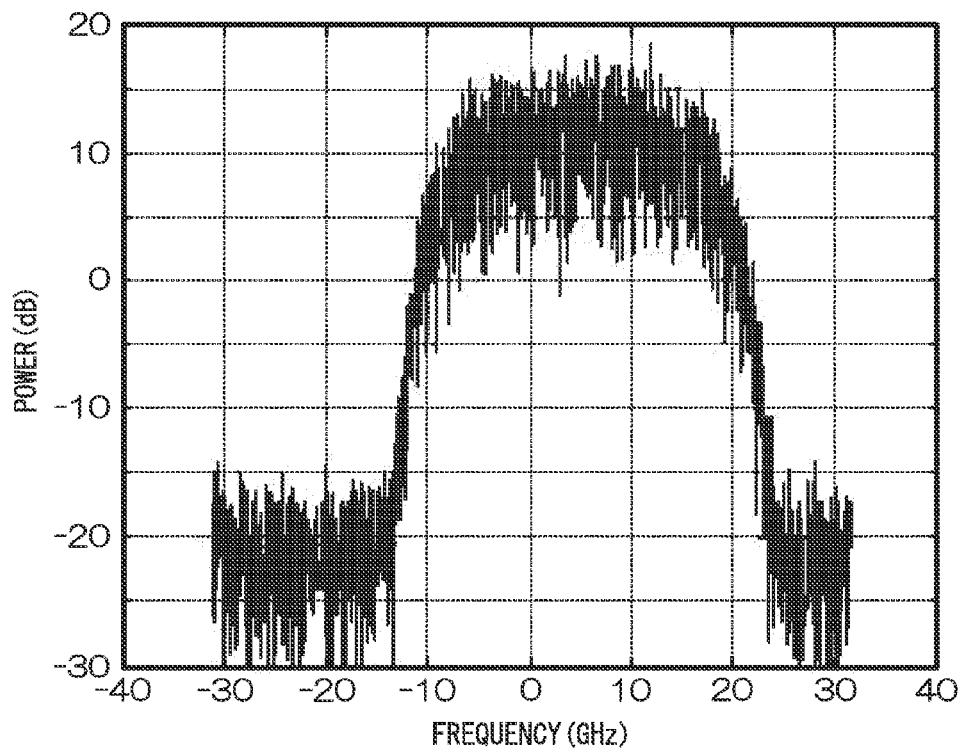
FIG. 4 is a conceptual diagram illustrating a result of simulating an operation of the first embodiment.
Figure 5:
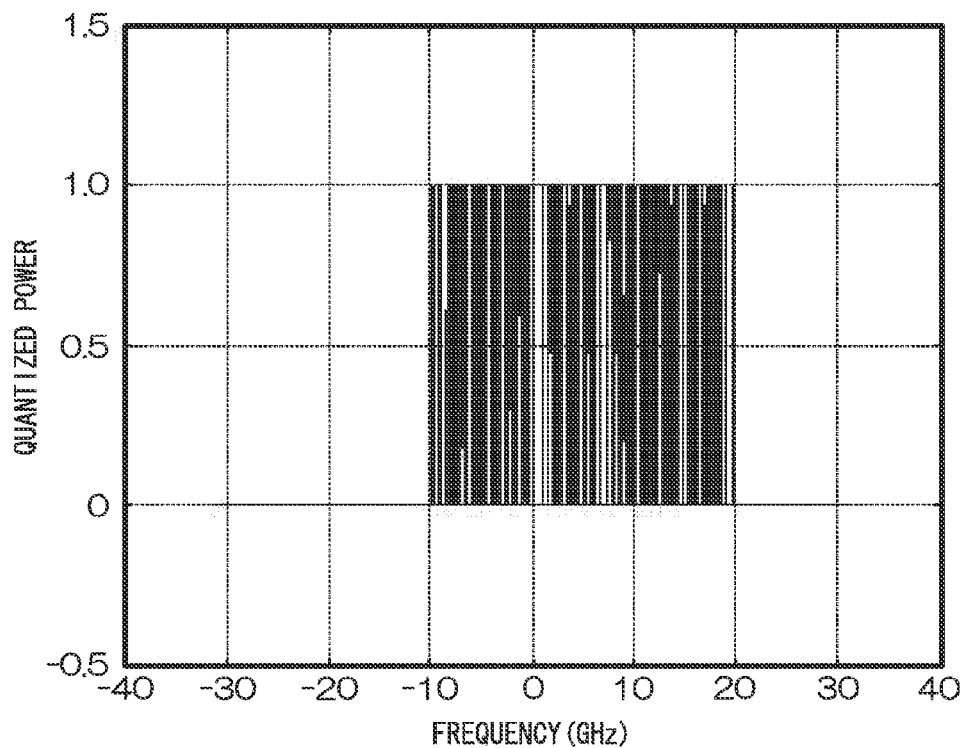
FIG. 5 is a conceptual diagram illustrating a result of simulating an operation of the first embodiment.
Figure 6:
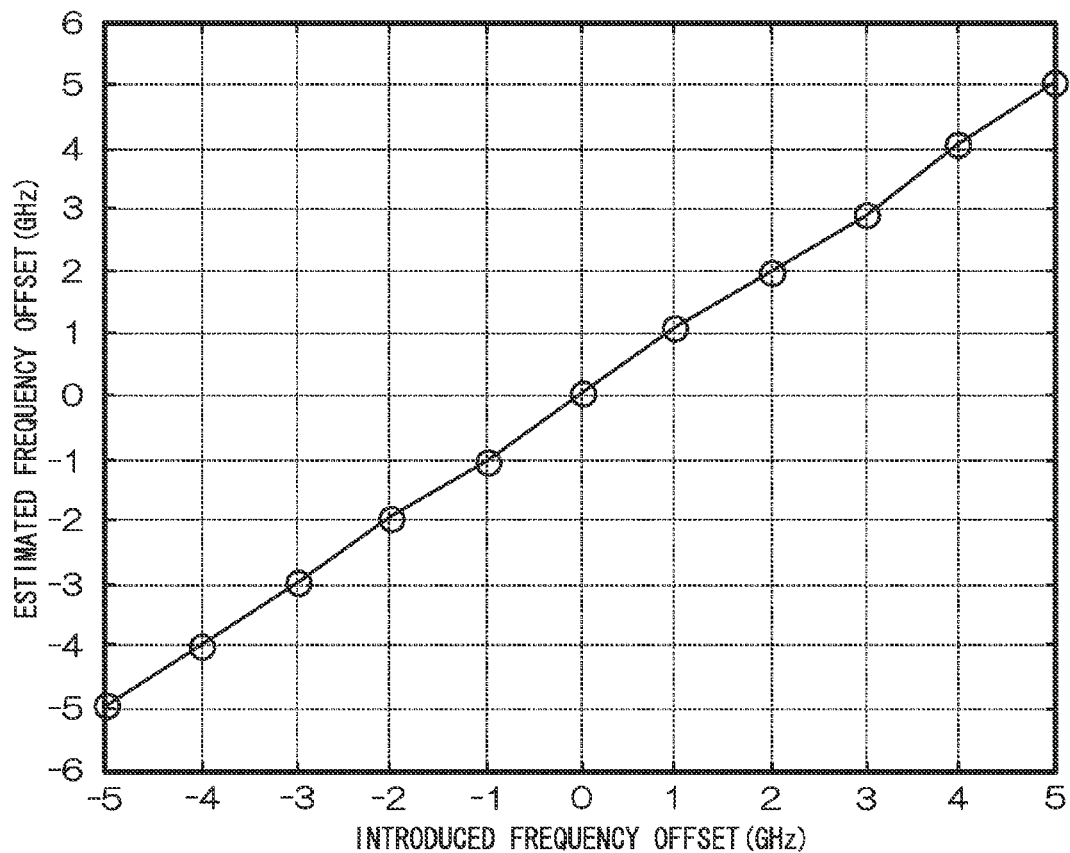
FIG. 6 is a conceptual diagram illustrating a result of simulating an operation of the first embodiment.

FIGS. 4 to 6 are conceptual diagrams illustrating results of simulating an operation of the first embodiment. FIG. 4 illustrates a frequency spectrum when a frequency offset of 5 GHz is given to a quadrature phase shift keying (QPSK) modulated signal having a symbol rate of 31.5 GHz. FIG. 5 illustrates a frequency spectrum when 1-bit quantization is performed using the average power as a threshold, and it can be understood that a frequency spectrum is shifted from the center to the right by a frequency offset.

FIG. 6 illustrates plots of a simulation result in which a horizontal axis represents introduced frequency offset, and a vertical axis represents estimated frequency offset of the first embodiment. Although the computation complexity is reduced by 1-bit quantization, the frequency offset can be estimated with a high degree of accuracy.

It is to be noted that in the first embodiment described above, the modulation scheme for the reception signal input to the first A/D converter 1 and the second A/D converter 2 may be OFDM or a single carrier modulation.

B. Second Embodiment

Next, a second embodiment of the present invention will be described.

Figure 7:
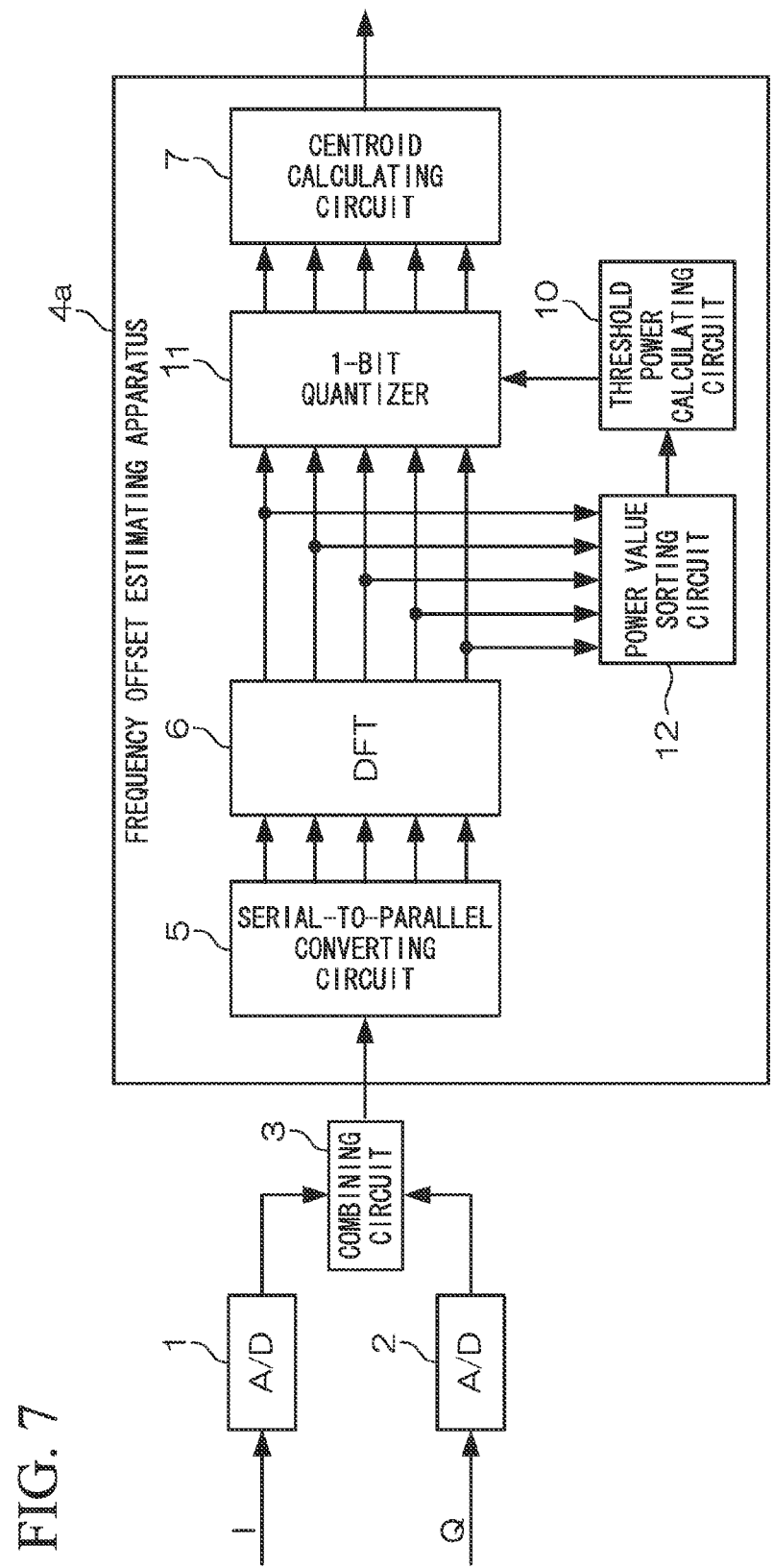
FIG. 7 is a block diagram illustrating a configuration example of a frequency offset estimating apparatus according to a second embodiment of the present invention.

FIG. 7 is a block diagram illustrating a configuration example of a frequency offset estimating apparatus according to the second embodiment of the present invention. In FIG. 7, a reference symbol 12 represents a power value sorting circuit. The power value sorting circuit 12 sorts power of each frequency component of the output frequency spectrum in ascending order or descending order of levels. The threshold power calculating circuit 10 calculates a threshold using a power value of a predetermined order among the sorted power values.

For example, when the number of frequency components of the frequency spectrum is $N_S$, an arbitrary integer ranging from 1 to $N_S$ is k, and the frequency components are sorted in ascending order or descending order of power levels, a value obtained by adding a predetermined value to a $k^{th}$ value from the beginning or power obtained by multiplying the $k^{th}$ value by a constant may be set as the threshold power. In other words, it is sufficient that the threshold power be set to a value having a correlation with the reception signal power; the threshold power is calculated based on the average power in the first embodiment and it is calculated based on the value of the frequency component of the frequency spectrum in the second embodiment.

Particularly, when the average value of an $(N_S/2)^{th}$ power value and an $(N_S/2+1)^{th}$ power value from the beginning when the $N_S$ frequency components are sorted in descending order of power levels, that is, the median thereof, is set as the threshold power $P_{TH}$ used by the 1-bit quantizer 11, 1 and 0 at the right side of Formula (4) become equal in number, that is, each of 1 and 0 becomes $N_S/2$ in number. Thus, the denominator of Formula (5) becomes $N_S/2$, and since this value is a power of 2, the circuit size can be significantly reduced.

Similarly, when the average value of an $(N_S/4)^{th}$ power value and an $(N_S/4+1)^{th}$ power value from the beginning when the $N_S$ frequency components are sorted in descending order of power levels is set as the threshold power $P_{TH}$ used by the 1-bit quantizer 11, 1 at the right side of Formula (4) becomes $N_S/4$ in number, and 0 becomes $3N_S/4$ in number. Thus, the denominator of Formula (5) becomes $N_S/4$, and since this value is also a power of 2, the circuit size can be significantly reduced.

In other words, when $N_S=2^m$ and k=0, 1, 2, ..., m−1, and the average value of a $(2^k)^{th}$ power value and a $(2^k+1)^{th}$ power value from the beginning when the frequency components are sorted in descending order of power levels is set as the threshold, the denominator of Formula (5) becomes a power of 2, and thus the circuit size can be significantly reduced. It is sufficient that the value of k be selected in accordance with the shape of a frequency spectrum determined by a modulation scheme and a band limiting element of a transmission line.

Figure 8:
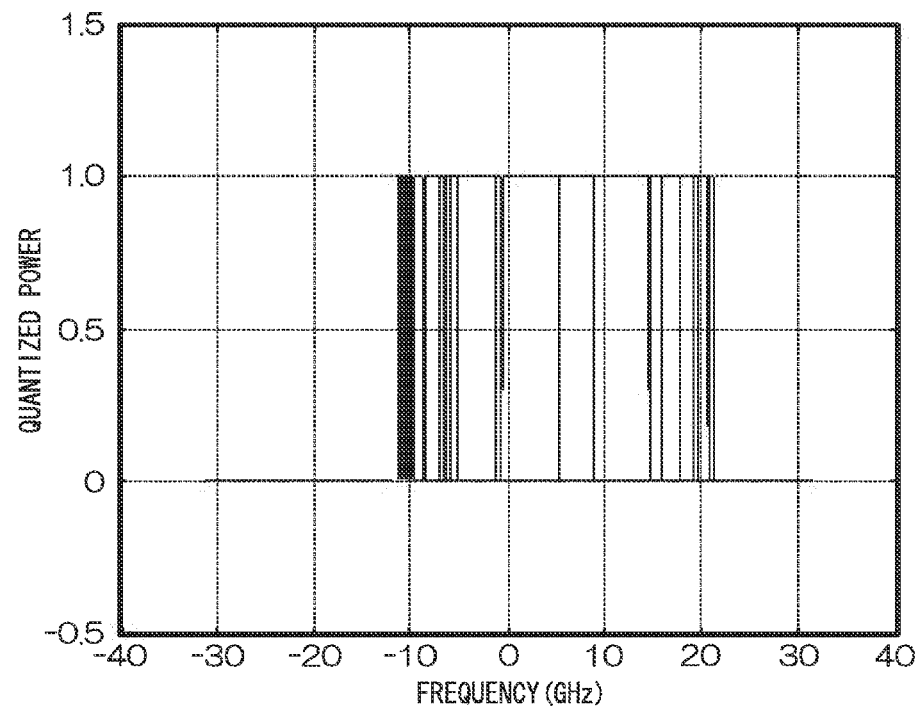
FIG. 8 is a conceptual diagram illustrating a result of simulating an operation of the second embodiment.
Figure 9:
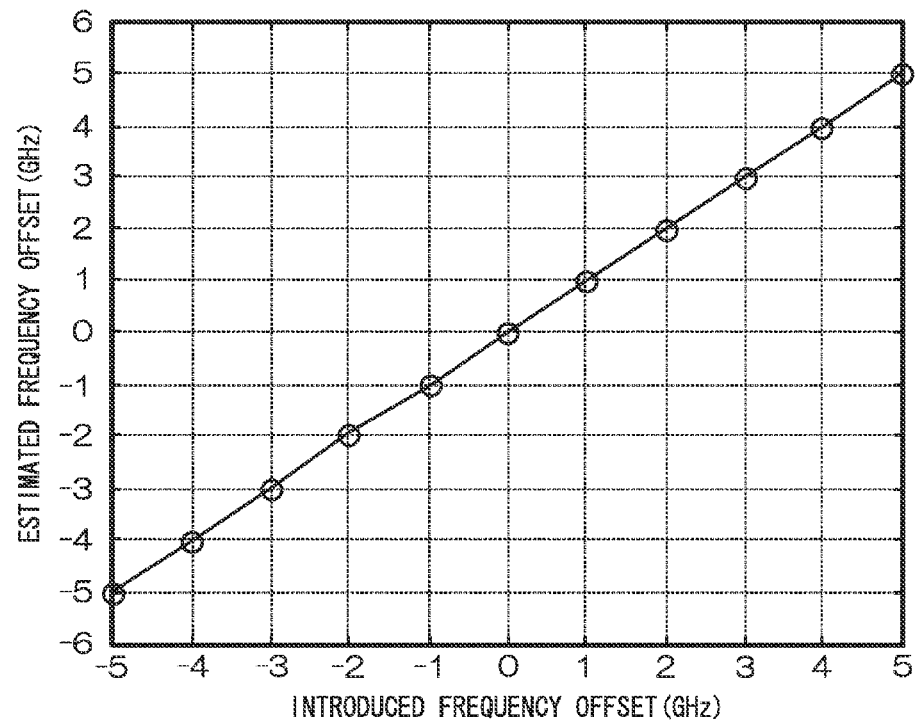
FIG. 9 is a conceptual diagram illustrating a result of simulating an operation of the second embodiment.
Figure 10:
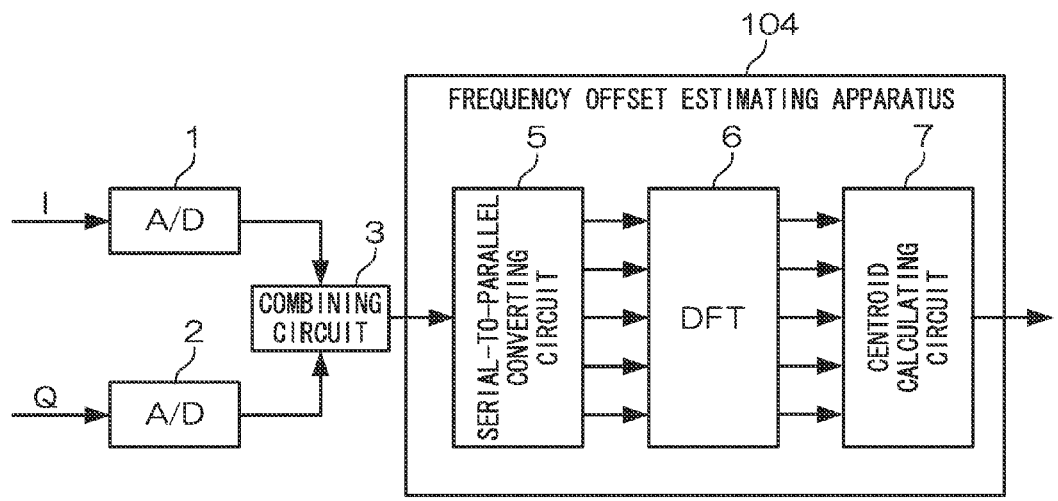
FIG. 10 is a block diagram illustrating a configuration example of a conventional frequency offset estimating apparatus.
Figure 11:
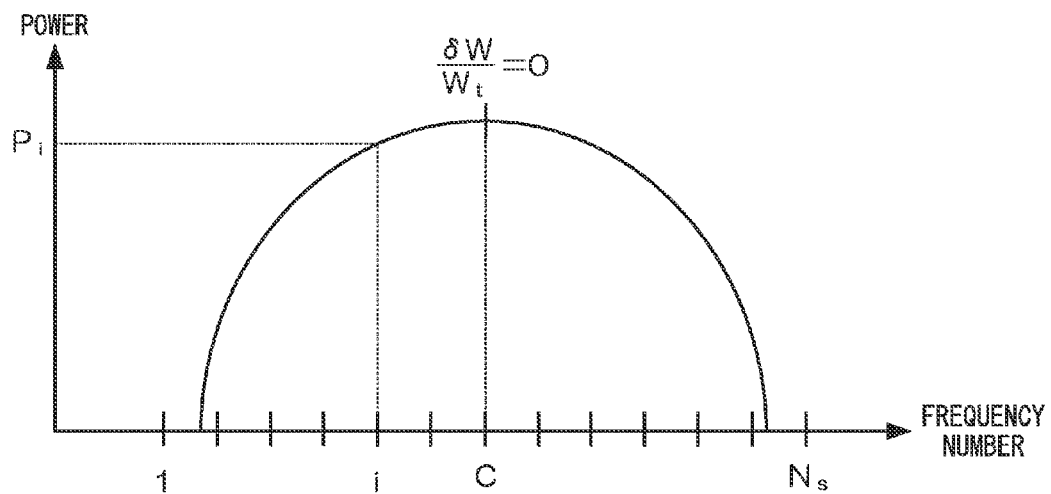
FIG. 11 is a conceptual diagram illustrating an operation of the conventional frequency offset estimating apparatus.
Figure 12:
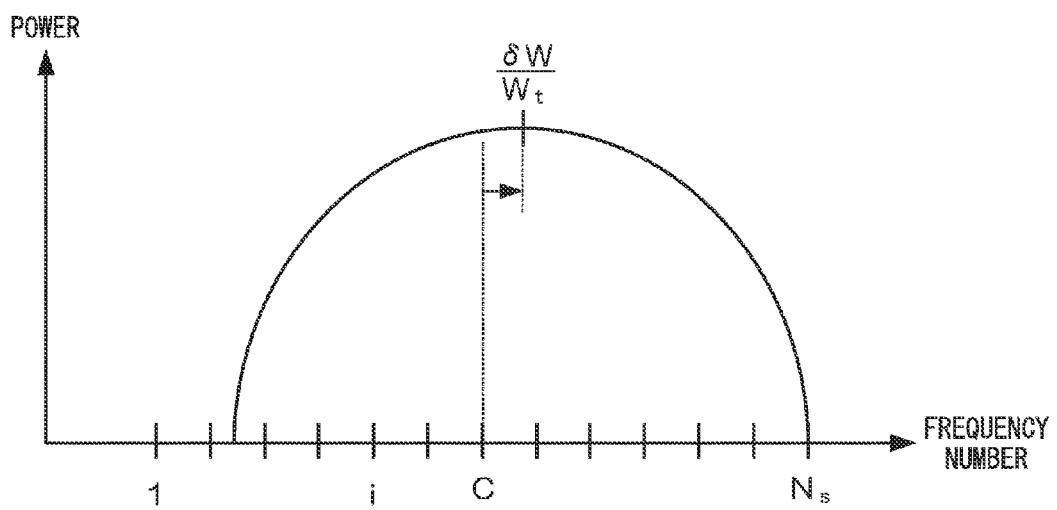
FIG. 12 is a conceptual diagram illustrating an operation of the conventional frequency offset estimating apparatus.

FIGS. 8 and 9 are conceptual diagrams illustrating results of simulating an operation of the second embodiment. FIG. 8 illustrates a frequency spectrum when a frequency offset of 5 GHz is given to a QPSK modulated signal having a symbol rate of 31.5 GHz, and 1-bit quantization is performed using a median as the threshold, and it can be understood that the frequency spectrum is shifted from the center to the right by a frequency offset. FIG. 9 illustrates plots of a simulation result in which a horizontal axis represents introduced frequency offset, and a vertical axis represents estimated frequency offset of the second embodiment, and it can be understood that the frequency offset can be estimated with a high degree of accuracy.

Furthermore, in the description of the first and second embodiments, in order to estimate a frequency offset, the centroid is calculated using all the frequency components of the frequency spectrum which has been subjected to the discrete Fourier transform. However, the centroid can be calculated after thinning out the frequency components for every several frequency components based on the trade-off between the required estimation accuracy and the circuit size.

Furthermore, the threshold power can be set in advance and an operation can be performed without changing the threshold power during the operation, if control is performed by another circuit such as an automatic gain control circuit such that the level of a signal input to the frequency offset estimating apparatus 4 or 4a is always constant. In this case, it is sufficient that the constant a of Formula (3) be set to 0, and the threshold power be determined based only on the constant b, which is irrelevant to an instantaneous reception signal power. Similarly to when the reception signal power changes, the constant b may be determined from a value obtained by adding a predetermined value to power input to the frequency offset estimating apparatus 4 or 4a or power obtained by multiplying the power input to the frequency offset estimating apparatus 4 or 4a by a constant, or a value obtained by adding a predetermined value to a $k^{th}$ value from the beginning or power obtained by multiplying the $k^{th}$ value by a constant when the frequency components of the frequency spectrum are sorted in ascending order or descending order of power levels.

It is to be noted that in this case, the average power calculating circuit 9 and the threshold power calculating circuit 10 illustrated in FIG. 1 and the power value sorting circuit 12 and the threshold power calculating circuit 10 illustrated in FIG. 7 may be omitted. In other words, the 1-bit quantizer 11 performs 1-bit quantization on the output signal of the discrete Fourier transform circuit 6 using preset threshold power.

As described above, according to the embodiments of the present invention, in the frequency offset estimating method using the shape of the frequency spectrum, the divisor of division calculation can be set to a power of 2 or an integer value of a limited range, and thus the size of a circuit implemented by hardware can be reduced.

The embodiments of the present invention have been described in detail with reference to the drawings, but the specific configuration is not limited to these embodiments, and designs or the like (additions, omissions, replacements, and other alternations of the configuration) can be made in a range not departing from the gist of the present invention. The present invention is not limited to the above description and is limited only by the accompanying claims.

INDUSTRIAL APPLICABILITY

The present invention can be used in, for example, a digital coherent optical receiver or a wireless communications receiver. According to the present invention, when a circuit that calculates a frequency offset using the shape of a frequency spectrum is implemented by hardware, the circuit size can be reduced.

The invention claimed is:

1. A frequency offset estimating method for estimating the difference between a carrier frequency of a reception signal and the frequency of an output signal of a local oscillator, the method comprising:
 a step of performing a discrete Fourier transform on a reception signal previously sampled at a predetermined sampling frequency and outputting a frequency spectrum with a plurality of frequency components;
 a step of calculating an average power of the frequency spectrum;
 a step of calculating a threshold by adding a predetermined value to the average power or power obtained by multiplying the average power by a constant;
 a step of performing 1-bit quantization on powers of the frequency components of the frequency spectrum based on the threshold; and
 a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

2. A frequency offset estimating method for estimating the difference between a carrier frequency of a reception signal and the frequency of an output signal of a local oscillator, the method comprising:
 a step of performing a discrete Fourier transform on a reception signal previously sampled at a predetermined sampling frequency and outputting a frequency spectrum with a plurality of frequency components;
 a step of sorting the plurality of frequency components of the frequency spectrum in order of power levels;
 a step of calculating a threshold by adding a predetermined value to a power value of a specific order among the sorted frequency components or power obtained by multiplying the power value of the specific order by a constant;
 a step of performing 1-bit quantization on powers of the frequency components of the frequency spectrum based on the threshold; and
 a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

3. A frequency offset estimating method for estimating the difference between a carrier frequency of a reception signal and the frequency of an output signal of a local oscillator, the method comprising:
 a step of performing a discrete Fourier transform on a reception signal previously sampled at a predetermined sampling frequency and outputting a frequency spectrum with a plurality of frequency components;
 a step of sorting the plurality of frequency components of the frequency spectrum in order of power levels;
 a step of calculating a threshold by arithmetically averaging power of the plurality of sorted frequency components;
 a step of performing 1-bit quantization on powers of the frequency components of the frequency spectrum based on the threshold; and
 a step of calculating a centroid frequency by multiplying the frequencies of the frequency components by powers of the 1-bit quantized frequency components, calculating the sum of multiplied products, and dividing the sum of the products by the sum of the powers of the 1-bit quantized frequency components of the frequency spectrum.

4. The frequency offset estimating method according to claim 3,
 wherein, in the step of calculating the threshold,
 when $N_S = 2^m$, k=0, 1, 2, . . . , m−1, and $N_S$ frequency components are sorted in descending order of power levels, the average value of a $(2^k)^{th}$ power value and a $(2^k+1)^{th}$ power value from the beginning is set as the threshold.

5. A frequency offset estimating method for estimating the difference between a carrier frequency of a reception signal and the frequency of an output signal of a local oscillator, the method comprising:
 a step of performing a discrete Fourier transform on a reception signal previously sampled at a predetermined sampling frequency and outputting a frequency spectrum with a plurality of frequency components;
 a step of performing 1-bit quantization on powers of the frequency components of the frequency spectrum based on a previously set threshold; and
 a step of calculating a centroid frequency by multiplying the frequencies of the frequency components by powers of 1-bit quantized frequency components, calculating the sum of multiplied products, and dividing the sum of the products by the sum of the powers of the 1-bit quantized frequency components of the frequency spectrum.

6. A frequency offset estimating apparatus for estimating the difference between a carrier frequency of a reception signal and the frequency of an output signal of a local oscillator, the apparatus comprising:
 a discrete Fourier transform unit that performs a discrete Fourier transform on a reception signal previously sampled at a predetermined sampling frequency and outputs a frequency spectrum with a plurality of frequency components;
 an average power calculating unit that calculates an average power of the frequency spectrum transformed by the discrete Fourier transform unit;
 a threshold power calculating unit that calculates a threshold by adding a predetermined value to the average power calculated by the average power calculating unit or power obtained by multiplying the average power by a constant;

a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of the frequency components of the frequency spectrum transformed by the discrete Fourier transform unit by powers of the frequency components 1-bit quantized by the 1-bit quantizing unit, calculates the sum of multiplied products, and divides the sum of the products by the sum of the powers of the 1-bit quantized frequency components of the frequency spectrum.

7. A frequency offset estimating apparatus for estimating the difference between a carrier frequency of a reception signal and the frequency of an output signal of a local oscillator, the apparatus comprising:

a discrete Fourier transform unit that performs a discrete Fourier transform on a reception signal previously sampled at a predetermined sampling frequency and outputs a frequency spectrum with a plurality of frequency components;

a power value sorting unit that sorts the plurality of frequency components of the frequency spectrum transformed by the discrete Fourier transform unit in order of power levels;

a threshold power calculating unit that calculates a threshold by adding a predetermined value to a power value of a specific order among the frequency components sorted by the power value sorting unit or power obtained by multiplying the power value of the specific order by a constant;

a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of the frequency components of the frequency spectrum transformed by the discrete Fourier transform unit by powers of frequency components 1-bit quantized by the 1-bit quantizing unit, calculates the sum of multiplied products, and divides the sum of the products by the sum of the powers of the 1-bit quantized frequency components of the frequency spectrum.

8. A frequency offset estimating apparatus for estimating the difference between a carrier frequency of a reception signal and the frequency of an output signal of a local oscillator, the apparatus comprising:

a discrete Fourier transform unit that performs a discrete Fourier transform on a reception signal previously sampled at a predetermined sampling frequency and outputs a frequency spectrum with a plurality of frequency components;

a power value sorting unit that sorts the plurality of frequency components of the frequency spectrum transformed by the discrete Fourier transform unit in order of power levels;

a threshold power calculating unit that calculates a threshold by arithmetically averaging power of the plurality of frequency components sorted by the power value sorting unit;

a 1-bit quantizing unit that performs 1-bit quantization on powers of the frequency components of the frequency spectrum based on the threshold calculated by the threshold power calculating unit; and a centroid calculating unit that calculates a centroid frequency by multiplying frequencies of frequency components of the frequency spectrum transformed by the discrete Fourier transform unit by powers of the frequency components 1-bit quantized by the 1-bit quantizing unit, calculates the sum of multiplied products, and divides the sum of the products by the sum of the powers of the 1-bit quantized frequency components of the frequency spectrum.

9. The frequency offset estimating apparatus according to claim 8, wherein when $N_S=2^m$, k=0, 1, 2, . . . , m−1, and $N_S$ frequency components are sorted in descending order of power levels, the threshold power calculating unit sets the average value of a $(2^k)^{th}$ power value and a $(2^k+1)^{th}$ power value from the beginning as the threshold.

10. A frequency offset estimating apparatus for estimating the difference between a carrier frequency of a reception signal and the frequency of an output signal of a local oscillator, the apparatus comprising:

a discrete Fourier transform unit that performs a discrete Fourier transform on a reception signal previously sampled at a predetermined sampling frequency and outputs a frequency spectrum with a plurality of frequency components;

a 1-bit quantizing unit that performs 1-bit quantization on powers of the frequency components of the frequency spectrum based on a previously set threshold; and a centroid calculating unit that calculates a centroid frequency by multiplying the frequencies of the frequency components of the frequency spectrum transformed by the discrete Fourier transform unit by powers of frequency components 1-bit quantized by the 1-bit quantizing unit, calculates the sum of multiplied products, and divides the sum of the products by the sum of the powers of the 1-bit quantized frequency components of the frequency spectrum.

* * * * *